(12) United States Patent
Ray et al.

(10) Patent No.: US 7,684,709 B2
(45) Date of Patent: Mar. 23, 2010

(54) FIBER AIDED WIRELESS NETWORK ARCHITECTURE

(75) Inventors: Siddharth Ray, Bedminster, NJ (US); Muriel Medard, Cambridge, MA (US); Lizhong Zheng, Canton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 666 days.

(21) Appl. No.: 11/540,975

(22) Filed: Sep. 29, 2006

(65) Prior Publication Data

US 2008/0080868 A1    Apr. 3, 2008

(51) Int. Cl.
*H04B 10/00* (2006.01)

(52) U.S. Cl. .................... 398/115; 398/66; 398/72; 398/116; 370/432; 370/389; 370/465; 455/422.1; 455/103; 455/445; 455/427

(58) Field of Classification Search .................. 398/115, 398/116, 117, 118, 135, 66, 67, 68, 69, 70, 398/71, 72, 79, 141, 74, 75, 73, 76, 77, 78, 398/59, 60, 98, 99, 100, 101, 102, 103, 119, 398/136, 158, 159; 370/310, 277, 338, 328, 370/329, 339, 432, 389, 465; 455/422, 422.1, 455/427, 103, 436, 445, 426
See application file for complete search history.

(56) References Cited

U.S. PATENT DOCUMENTS

| | | | |
|---|---|---|---|
| 6,560,441 B1 | 5/2003 | Sabat, Jr. et al. | |
| 6,785,558 B1 | 8/2004 | Stratford et al. | |
| 7,013,087 B2 * | 3/2006 | Suzuki et al. | 398/115 |
| 2002/0163454 A1 * | 11/2002 | Yap et al. | 341/137 |
| 2003/0036410 A1 | 2/2003 | Judd et al. | |
| 2004/0017785 A1 | 1/2004 | Zelst | |
| 2004/0047313 A1 | 3/2004 | Rumpf et al. | |
| 2005/0266797 A1 | 12/2005 | Utsumi et al. | |
| 2006/0029090 A1 | 2/2006 | Bione | |
| 2007/0286599 A1 * | 12/2007 | Sauer et al. | 398/28 |

OTHER PUBLICATIONS

Tsitsiklis, J. N., "Decentralized Detection," In *Advances in Statistical Signal Processing*,, vol. 2, (JAI Press), pp. 297-344 (1993).
Berger, T., et al., "The CEO Problem," *IEEE Transactions on Information Theory*, (42): 887-902 (1996).
Zamir, R. and Berger, T., "Multiterminal Source Coding with High Resolution," *IEEE Transactions on Information Theory*, (45): 106-117 (1999).

* cited by examiner

*Primary Examiner*—Hanh Phan
(74) *Attorney, Agent, or Firm*—Hamilton, Brook, Smith & Reynolds, P.C.

(57) ABSTRACT

A FAWNA that allows high-speed mobile connectivity by leveraging the speed of optical networks. Specifically, SIMO FAWNA, which comprises a SIMO wireless channel interfaced with a fiber channel through wireless-to-optical interfaces. Received wireless signal at each interface are sampled and quantized prior to transmission. The capacity of the FAWNA approaches the capacity of the architecture exponentially with fiber capacity. It is also shown that for a given fiber capacity, there is an optimal method of operating wireless bandwidth and number of interfaces. An optimal method to divide the fiber capacity among the interfaces is shown, which ensures that each interface is allocated a rate so that noise is dominated by front end noise rather than by quantization distortion. A method is also presented in which, rather than dynamically changing rate allocation based on channel state, a less complex, fixed rate allocation may be adopted with very small loss in performance.

25 Claims, 14 Drawing Sheets

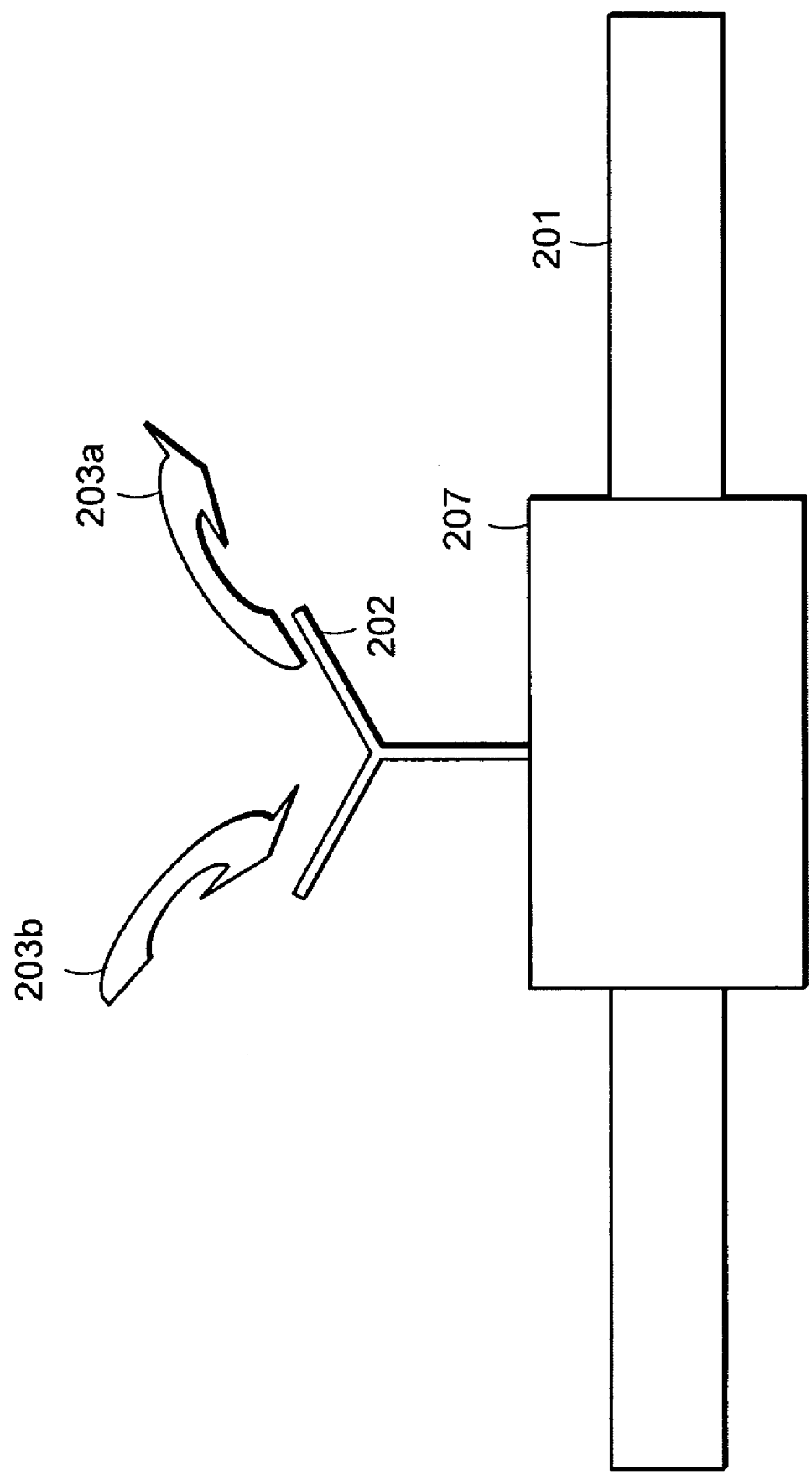

Near-optimality Static Rate Allocation

FIBER AIDED WIRELESS NETWORK ARCHITECTURE

GOVERNMENT SUPPORT

This invention was made with government support awarded by The National Science Foundation (NSF) under Grant Nos. CNS-0434974 and ANI-0335256 and by the U.S. Air Force under Grant No. F49620-01-1-0365. The Government has certain rights in this invention.

BACKGROUND OF THE INVENTION

Wireless networks rely on 'free space' radio wave based technology to enable communications between devices in a limited area. Wireless networks also provide users with mobility to move around within a broad coverage area and still be connected to the network. Wireless local area networks (LAN) typically include stations wirelessly connected to access points to access a wired network.

In contrast, optical communications rely on optical waveguides to transmit an optical signal between static nodes (i.e., non-mobile). An optical communications system may include a transmitter, which modulates a message onto an optical carrier wave signal, an optical waveguide (e.g., optical fiber), which carries the signal to its destination, and a receiver, which demodulates and reproduces the message from the received optical signal.

SUMMARY OF THE INVENTION

There is a considerable demand for increasingly high-speed communications networks with mobile connectivity. Traditionally, high-speed communications have been provided through wireline infrastructures, particularly based on optical fibers, where bandwidth is plentiful and inexpensive. However, such infrastructures do not support mobility. Instead, mobile communications are provided by wireless infrastructures, most typically over the radio spectrum. However, limited available spectrum and interference effects limit mobile communications to data rates lower than data rates supported by wireline or fiber optic infrastructures.

An embodiment of the present invention may be implemented in a form of a hybrid system that allows for both wireless mobility and high-speed wireline or fiber optic communications. A communications system and method for providing a fiber aided wireless network according to one embodiment of the present invention is presented herein. An example system comprises (i) multiple interfaces configured to receive wireless communications signals and transmit non-decoded signals on at least one communications path, and (ii) a central processor coupled to the at least one communications path to jointly process the non-decoded signals to produce decoded information.

The central processor may be configured to jointly process the non-decoded communications using a technique applicable to combining signals received by multiple antennas. The central processor may also include a transmitter unit configured to transmit the decoded information in the form of packets; the decoded information may be transmitted to a node in a network. The central processor may further be configured to transmit a downstream signal to at least a subset of the multiple interfaces in a substantially simultaneous manner.

The multiple interfaces may comprise a conversion unit with a quantizer to convert the wireless communications signals to the non-decoded communications by quantizing the wireless communications signals in an encoded state. A data rate between a given interface and the central processor may be allocated to allow the quantizer to quantize the wireless communications signals with quantization distortion less than noise at a front end of the given interface. The interfaces may further include a downconverter to downconvert the wireless communications signals to baseband signals without first converting the wireless communications signals to intermediate frequency signals.

In addition, the interfaces may also include a sampler to sample the baseband signals at a rate equal to at least a rate at which the wireless communications signals are received. The interfaces may also be configured to support a given bandwidth to balance quantization errors and power efficiency. The interfaces may be coupled to an optical fiber with a fixed data rate and may be selectively enabled to support wireless-to-fiber communications at the fixed data rate. The interfaces may be configured to receive the wireless communications signals at a first data rate and may be configured to transmit the non-decoded communications to the central processor at a second data rate that is greater than the first data rate.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 is an enlarged view of a wireless-to-wireline interface in the fiber aided wireless network of FIG. 1;

DETAILED DESCRIPTION OF THE INVENTION

A description of example embodiments of the invention follows.

Figure 1A:
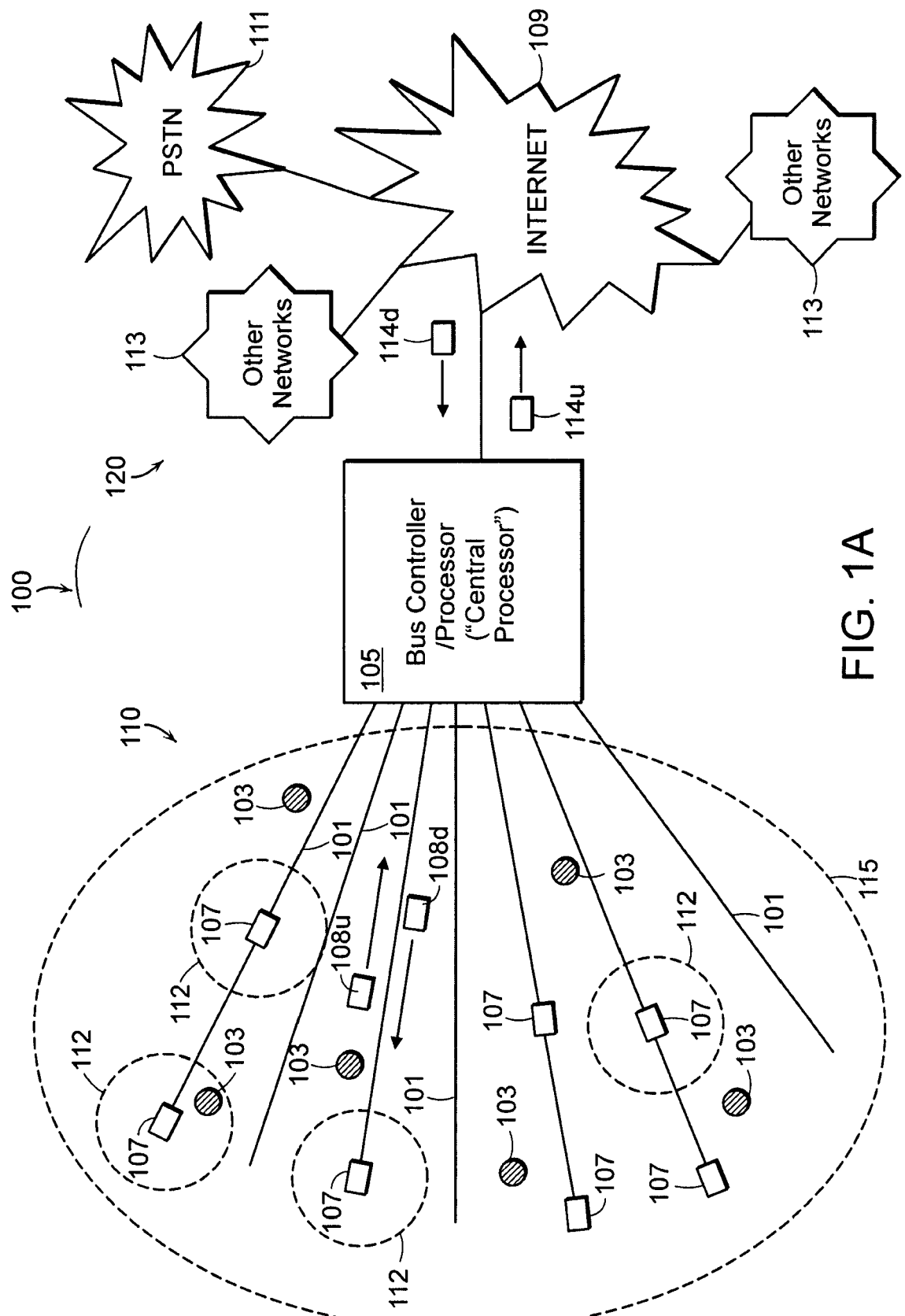
FIG. 1A is a network diagram depicting an overview of a fiber aided wireless network employing an example embodiment of the present invention.

FIG. 1A illustrates an example embodiment of the present invention having a fiber aided wireless network architecture (FAWNA), which supports mobile connectivity with high-speed by leveraging speed of an optical network infrastructure. A communications network 100 includes a FAWNA system 110 employing optical fibers 101, which are passed through various wireless zones 112. A wireless network coverage area 115 may be divided into zones 112 such that the optical fibers 101 pass through each zone 112 to support the mobile connectivity.

Figure 1B:
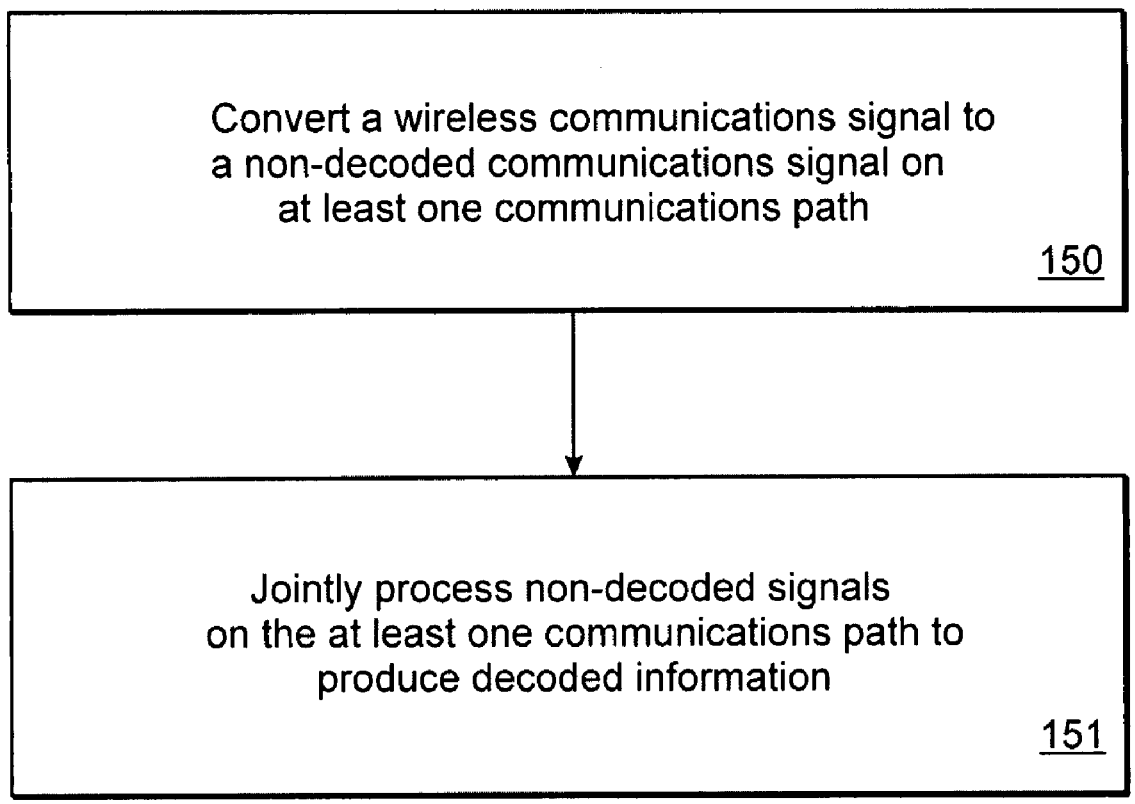
FIGS. 1B and 1C are flow diagrams illustrating processing steps of the fiber aided wireless network.

Connected to one end of the fibers 101 is a bus controller/processor ("central processor") 105, which coordinates use of the fibers 101 as well as connectivity to other networks 120 ("the outside world"). As shown in FIG. 1, the bus controller/processor 105 may be connected to traditional networks 120, such as the Internet 109, a public switched telephone network (PSTN) 111, or any number of networks 113 either directly or via one or more networks.

Along the fibers 101 are Radio Frequency (RF)-to-optical converters (i.e., wireless-to-optical interfaces) 107, which are also referred to herein as wireless access points, connected to the fiber 101. Wireless devices 103 communicate signals or data 108u, 108d (where "u" and "d" refer to "upstream" and "downstream," respectively) with the interfaces 107 in any wireless manner understood in the art, such as through CDMA, TDMA, or GSM wireless communications protocols.

Each wireless-to-optical interface 107 has at least one antenna (not shown) that harvests energy from the wireless domain to acquire full radio bandwidth in its local environment (e.g., zone 112). In turn, the associated interface 107 converts the energy of the received wireless communications signal into an associated waveform (not shown) and down-converts the waveform into a transmitted signal that is on a logical subchannel of a communications signal traversing the respective fiber 101. In one embodiment, the interfaces 107 receive wireless communications signals, convert the wireless communications signals to non-decoded communications by quantization techniques (discussed below in reference to FIG. 4), and transmit the non-decoded communications 108u via a communications path (e.g., optical fiber 101) to the controller/processor 105 (150, FIG. 1B).

The harvested signals 108u on the fibers 101 can be manipulated by the bus controller/processor 105 and made available in the form of downstream communications 108d to all other interfaces 107. The controller/processor 105 may jointly process the received non-decoded communications 108u into decoded communications and transmit the decoded communications, in the form of packets 114u, to a node (not shown) in one of the traditional the networks 102 (151, FIG. 1B).

Figure 1C:
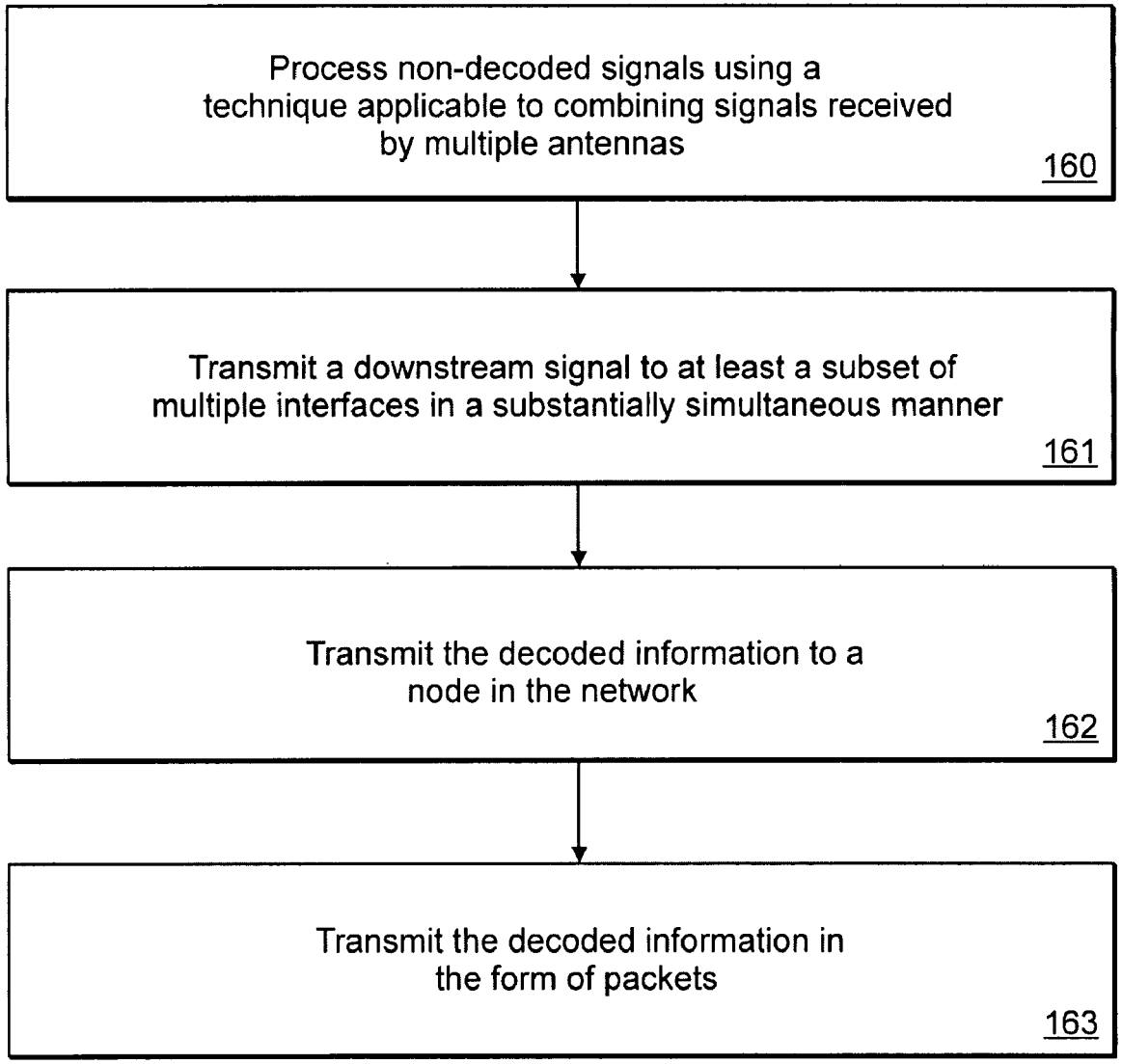

Upon processing the non-decoded signals using a technique applicable to signals received by multiple antennas (160, FIG. 1C), the controller/processor 105 may be configured to transmit a downstream signal 108d to the interfaces 107 in a substantially simultaneous manner to allow a wireless device 103 to receive the signal 108d in zones 112 of multiple interfaces 107 (161, FIG. 1C). Alternatively, the controller/processor 105 may have intelligence, which may be adaptive, to determine which zone 112 a particular wireless device 103 is in and direct a particular downstream signal 108d intended for the particular wireless device to a particular interface 107. The controller/processor 105 may also transmit 114u or receive 114d signals from other networks 120. The controller/processor 105 may also transmit the decoded information to a node in the network in the form of packets (162 and 163, respectively, FIG. 1C).

In each zone 112, there may be one or more active wireless devices 103. Wireless devices 103 communicate between one another, or to the outside world 120, by communicating to a nearby wireless-to-optical interface 107. The wireless interfaces 107 relay wireless signals received from a wireless device 103 over an optical fiber 101. Thus, in the example network of FIG. 1A, any wireless device 103 in the network 110 is at most two hops (i.e., wireless link and fiber link) away from the bus controller/process 105, regardless of the size of the network 110. Moreover, each interface 107 in an embodiment of the FAWNA system 100 can communicate directly with the bus controller/processor 105 via a fiber 101 in both upstream (i.e., interface 107 to bus controller/processor 105) or downstream (i.e., bus controller/processor 105 to interface 107) directions, so upstream and downstream signals 108u and 108d can be communicated between the wireless devices 103 via the bus controller/processor 105 in two fiber hops.

FIG. 2 is a diagram illustrating an interface 207, connected to a fiber optic 201, that includes an antenna 202 used to transmit and receive radio frequency (RF) signals 203a and 203b, respectively. The antenna 202 may be any form of antenna, such as an omni-directional, directional, diversity, or adaptive antennas, that can be used to support RF communications with wireless devices, such as cell phones, personal digital assistants (PDAs), laptop computers equipped with wireless communications capability, and so forth. It should be understood that the antenna 202 may be replaced or supplemented with other wireless element(s) in other network embodiments, such as an acoustic transducer(s) or free-space optical transceiver(s).

Thus, referring again to FIG. 1A, the example FAWNA system 110 architecture described above allows for flexibility of a mobile communications network, for example, while having potential to dramatically reduce interference effects caused by, for example, wireless devices being located at different distances from a receiving station, as understood in the art.

A FAWNA system 110 according to an embodiment of the present invention uses the wireline infrastructure (e.g., fibers 101) to provide a distributed means of aggressively harvesting energy from the wireless medium in areas where there is a rich, highly vascularized, wireline infrastructure and distributing, in an effective manner, energy to the wireless domain by making use of the proximity of wireless transmitters and receivers to reduce interference. The architecture presented herein makes use of the fact that areas with a high density of users (i.e., urban areas, indoor business, or educational settings) generally have the most severe interference problem and the most dense wireline infrastructure. Moreover, while wireless channels exhibit significant congestion, generally in the form of interference, optical fiber infrastructure typically has significant over-provisioning, with an abundance of fiber that is not lit or only very partially used.

Figure 3:
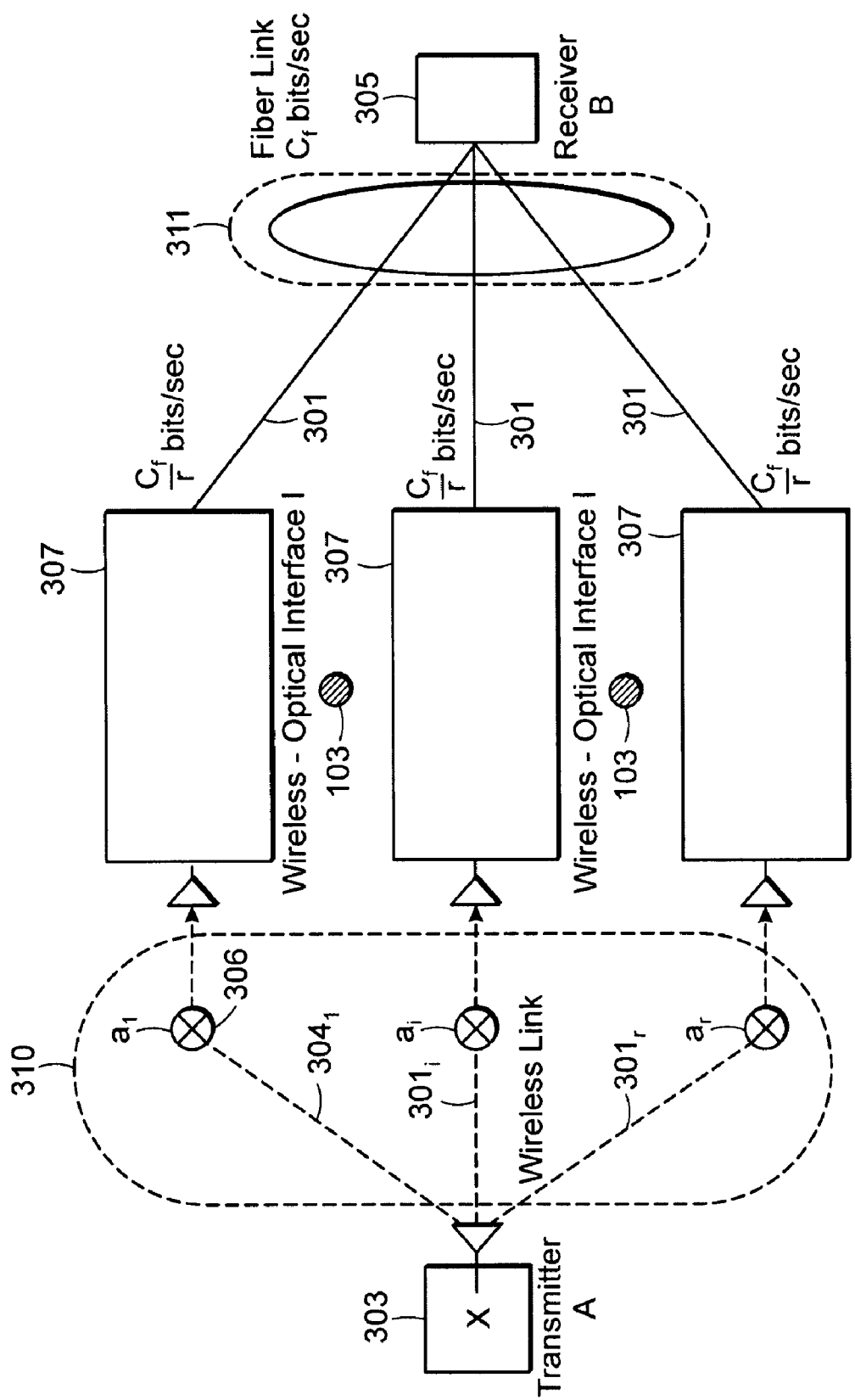
FIG. 3 is a network diagram depicting an overview of a portion of a fiber aided wireless network.

FIG. 3 is a block diagram of a portion of a network 300 illustrating another embodiment of a FAWNA system 310 that has a single-input, multiple-output fiber aided wireless network (SIMO-FAWNA) architecture. In a two hop link, between points A (transmitter) 303 and B (receiver) 305, the first hop is over a wireless link 304, and the second hop is over a fiber optic link 301. The fiber optic links 301 have capacities larger than that of the wireless links 304. It should be appreciated that other SIMO-FAWNA configurations may also incorporate fiber optic links whose capacity is equal to or less than that of a wireless link capacity.

A transmitter at point A 303 may transmit information to intermediate wireless-to-optical interface(s) 307 over a wireless SIMO link 304. The wireless link 304 may add noise $a_i$ 306 to wireless signals between the wireless-to-optical interfaces 307. The wireless-to-optical interfaces 307 then relay the information to the destination, point B 305, over a fiber optic link 301. The end-to-end design may be configured to maximize the transmission rate between points A and B.

Since the FAWNA system 300 has a large number of wireless-to-optical interfaces 307, it lessens hardware complexity of the wireless-to-optical interface 307 without sacrificing too much in performance. As an example, finite-dimensional, high resolution quantizers (not shown) may be used by the interfaces 307. Prior art systems rely on wireless-to-optical interfaces that use infinite dimensional vector quantization, a technique which requires complex hardware, in order to solve the problem of rate distortion. In an embodiment of the present invention, a maximum end-to-end rate is computed at which reliable communications are possible. Thus, unlike prior art systems, examples of the FAWNA system 310 presented herein may employ a finite number of wireless-to-optical interfaces, and the rate from interface 307 to receiver B 305 is high, owing to the capacity of the fiber being large.

Figure 4A:
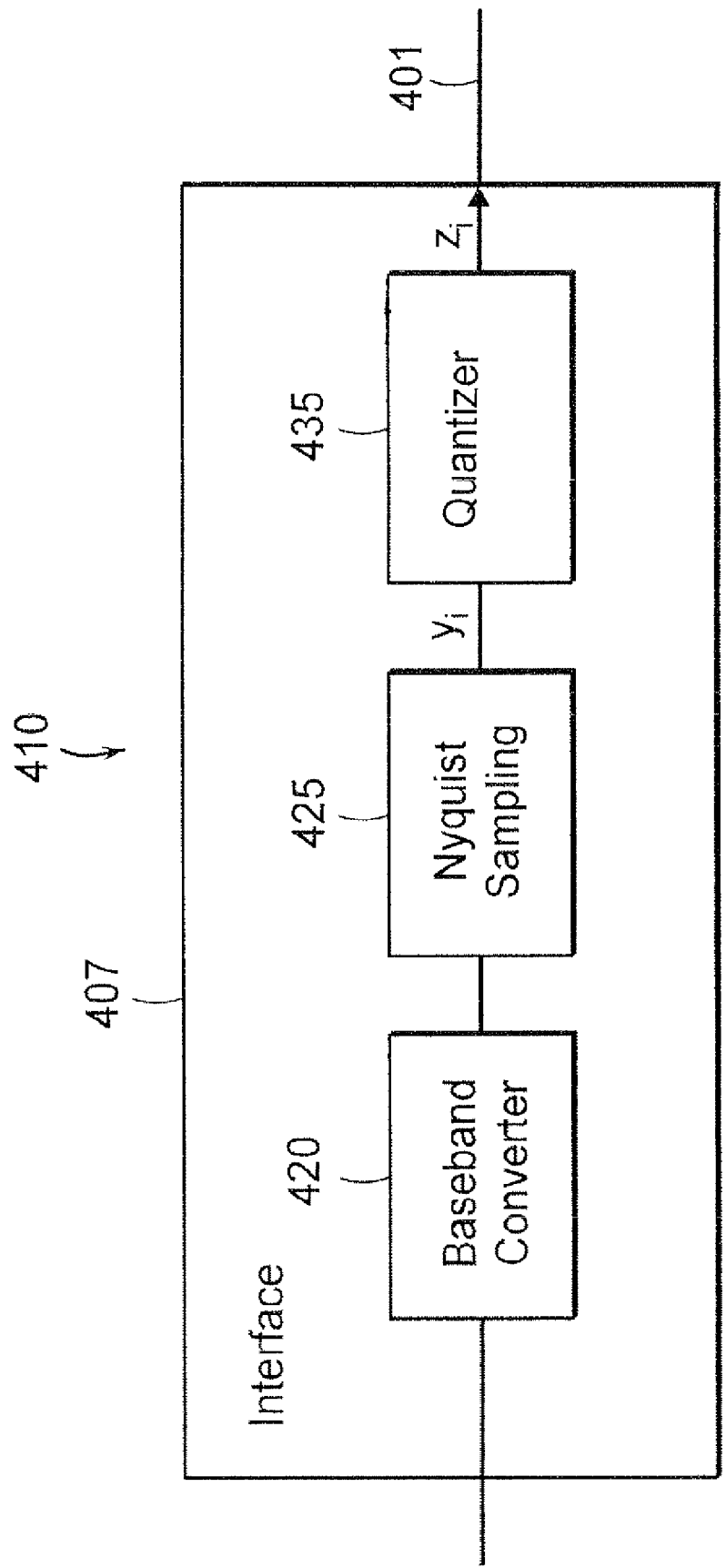
FIG. 4A is a detailed block diagram of a wireless-to-wireline interface.
Figure 4B:
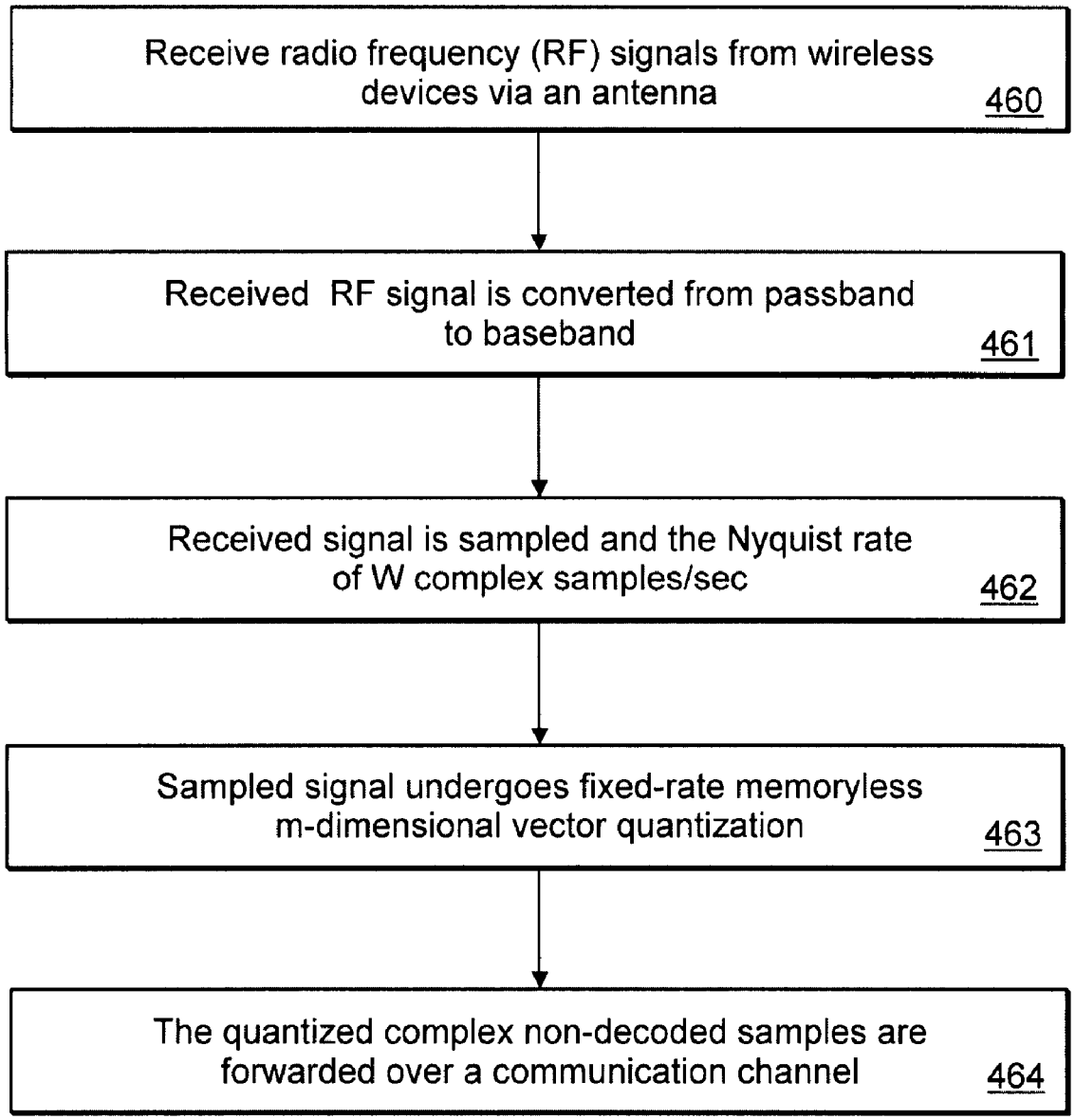
FIGS. 4B and 4C are flow diagrams illustrating processing steps of the wireless-to-wireline interface.

FIG. 4A is a block diagram of an example interface 407 according to an embodiment of the present invention. The interface 407 may receive RF signals from wireless devices (e.g., device 103, FIG. 1A) via an antenna 201 (460, FIG. 4B). Upon receiving the RF signals, the interface 407 may convert the RF signal from passband to baseband using a baseband converter 420 (461, FIG. 4B). The converted signal is then sampled at a Nyquist rate of W complex samples/sec 425 (462, FIG. 4B). The sampled signal ($y_i$) may then undergo a fixed-rate and memoryless m-dimensional vector quantization 435 (463, FIG. 4B). The quantized complex non-decoded signals ($z_i$) may then be forwarded over a communications path 401 (464, FIG. 4B). Hence, the interfaces 407 use a forwarding method. Since transmission of continuous values over the fiber is presently not possible using today's commercial lasers, quantization is used for the implementation of a forwarding method in the FAWNA 410.

Figure 4C:
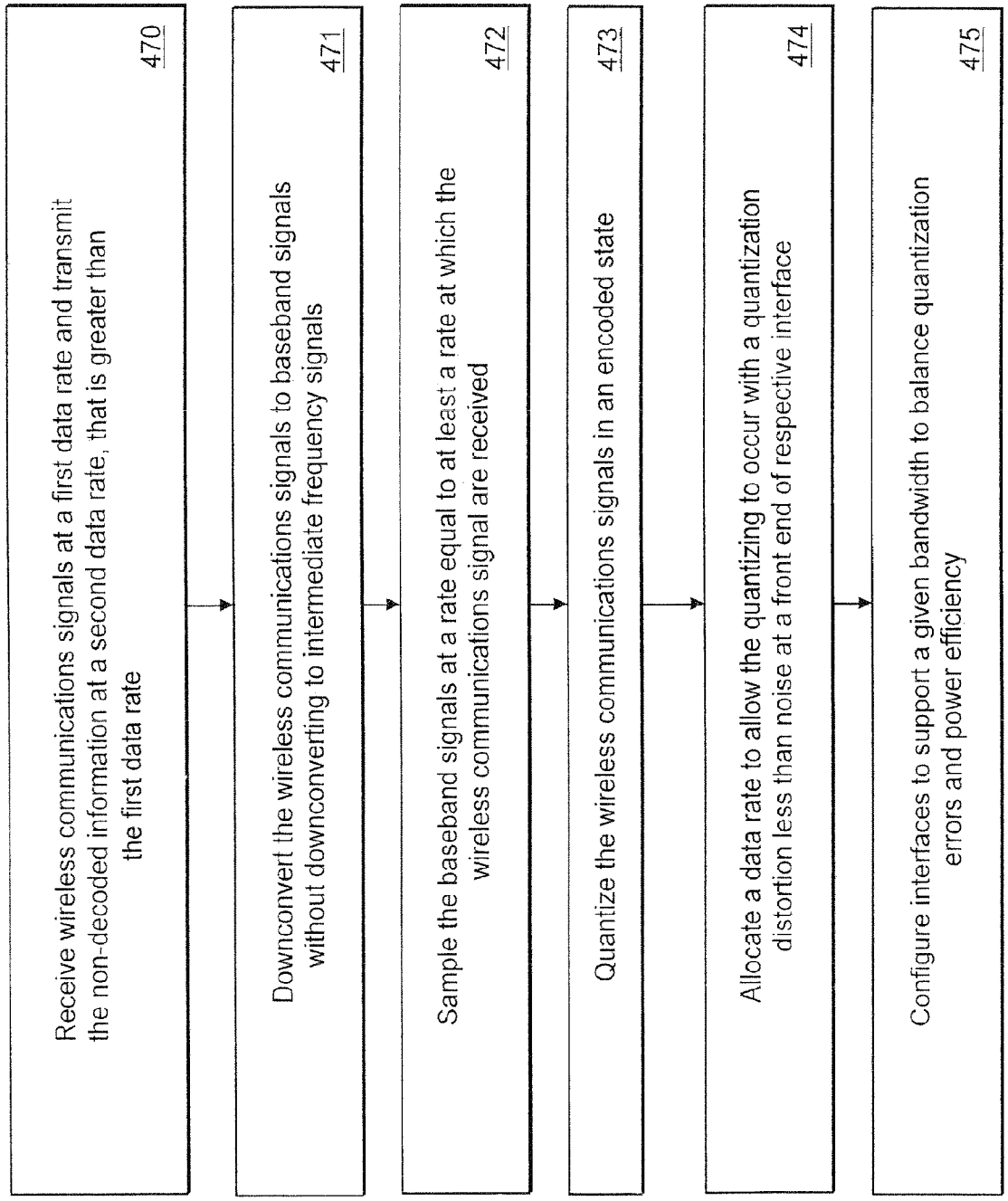

As indicated in FIG. 4C, the interface 407 may receive the wireless communications signals at a first data rate and transmit the non-decoded information at a second data rate, where the second data rate is greater than the first data rate 470. The baseband converter 420 may downconvert the wireless communications signals to baseband signals without downconverting to intermediate frequency signals 471. The sampler 425 may sample the baseband signals at a rate equal to at least a rate at which the wireless communications signals are received 472. The quantizer 435 may quantize the signals in an encoded state 473, while allocating a data rate to allow the quantizing to occur with a quantization distortion less than noise at a front end of a respective interface 474. The interfaces 407 may also be configured to support a given bandwidth to balance quantization errors and power efficiency 475.

The example interfaces 407 thus employ quantization between end-to-end coding and decoding, which eliminates a requirement of knowledge of the transmitter code book at the wireless-to-optical interface 407. The loss in "soft" information due to quantization of the wireless signal goes to zero asymptotically with an increase in fiber capacity. The interface 407 has low complexity; is practical to implement; is extendable to FAWNAs with a large number of transmitters and interfaces; and offers adaptability to variable rates, changing channel conditions, and node positions.

A FAWNA is an example of a channel model where quantization is performed between source/channel encoding and decoding operations. Another example is a communications system where the receiver quantizes the incoming signal prior to decoding (e.g., receiver implementation using a digital signal processor). The analysis presented herein extends to all such channel models. The capacities of the wireless and optical channels are herein donated as $C_w(P, W, r)$ and $C_f$ bits/sec, respectively, where, P is the average transmit power at A, W is the wireless transmission bandwidth, and r is the number of wireless-to-optical interfaces. As stated earlier, links include fiber optic channels whose capacity is larger than that of a wireless channel capacity, or, in other words, $C_w(P, W, r) < C_f$. Thus, the capacity of a SIMO-FAWNA, $C_{SIMO}(P, W, r, Cf)$, can be upper bounded as:

$$C_{SIMO}(P,W,r,C_f) \le \min \quad \{C_w(P,W,r), C_f\} = C_w(P,W,r) \quad (1)$$
$$\text{bits/sec.}$$

One way of communicating over a SIMO-FAWNA is to decode and re-encode at the wireless-to-optical interface 407. A major drawback of the decode/re-encode method is significant loss in optimality because "soft" information (i.e., phase amplitude, and other wireless signal parameters) in the wireless signal is lost by decoding at the wireless-to-optical interface 407, so an ability to improve performance through use of multiple antenna gain processing is lost. Moreover, decoding results in the wireless-to-optical interface 407 having high complexity and requires knowledge of the transmitter code book used to encode information carried by the wireless signal so that the information can be properly decoded.

The capacity using the method presented above approaches the upper bound, as shown in equation (1), exponentially with fiber capacity. The proposed method is thus near-optimal since the fiber capacity is larger than the wireless capacity. Low dimensional (or even scalar) quantization can be done at the interfaces 407 without significant loss in performance. Not only does this result in low complexity, but also smaller (or no) buffers are used, thereby further simplifying the interface 407.

For a SIMO-FAWNA with fixed fiber capacity, quantizer distortion, and wireless capacity, $C_w(P, W, T)$ increases with wireless bandwidth and number of interfaces. The two competing effects allow for optimizing FAWNA system performance through proper selection of an operating wireless bandwidth and an optimal number of wireless-to-optical interfaces.

Analysis of the system model and communications method is now presented, followed by an analysis of interface rate allocation and performance. Herein, bold type is used to denote random quantities, whereas normal type font is used to denote deterministic ones. Matrices are denoted by capital letters, and the scalar or vector components of matrices are denoted using appropriate subscripts. Vectors are represented by small letters with an arrow over them. All vectors are column vectors unless they have a $^T$ superscript. Scalars are represented by small letters only. The superscript $^\dagger$ is used to denote a complex conjugate transpose. Unless specified otherwise, all logarithms are to the base 2.

I. Model and Communications Method

A. The Wireless Channel

An example SIMO-FAWNA system comprises r wireless-to-optical interfaces (e.g., interfaces 407), with each interface being equipped with a single antenna (e.g., antenna 201). The interfaces relay the wireless signals they receive from a wireless transmitter (e.g., transmitter A) to a receiver (e.g., processor/controller at point B) over a communications channel (e.g., optical fiber 401). Communications over the communications channel are interference free, which may be achieved, for example, using Time Division Multiple Access (TDMA) or Frequency Division Multiple Access (FDMA) communications protocols.

A linear model for the wireless channel between the wireless transmitter A and the wireless-to-optical interfaces is represented by:

$$\vec{y} = \vec{a}x + \vec{w} \quad (2)$$

where, $x \in \mathbb{C}$, $\vec{w}$, $\vec{y} \in \mathbb{C}^r$ are the channel input, additive noise and output, respectively. Ergodic block fading is assumed where $\vec{a} \in \mathbb{C}^r$ is the channel state that is random but fixed for the coherence time of the channel and changes independently from block to block. The channel gain across time, or blocks, is an ergodic random process. A fading model may be used in the evaluation of wireless channels. The channel state is independent of the channel input, and the additive noise and may be known at the receiver at the processor/controller B but not at the transmitter and the wireless-to-optical interfaces. $a_i$ denotes the channel gain from the transmitter to the $i^{th}$ wireless-to-optical interface. The additive noise, $\vec{w} \sim CN(0, N_0 I_r)$, is independent of the channel input and $N_0/2$ is the double-sided white noise spectral density. The channel input, x, satisfies the average power constraint $E[|x|^2] = P/W$, where P and W are the average transmit power at the wireless transmitter, A, and wireless bandwidth, respectively. Hence, the wireless channel capacity is:

$$C_w(P, W, r) = W \log\left(1 + \frac{\|\vec{a}\|^2 P}{N_0 W}\right) \quad (3)$$

and W symbols are transmitted over the wireless channel every second in some embodiments, or, other rates in other network embodiments.

B. The Fiber Optic Channel

The fiber optical channel between the wireless-to-optical interface 407 and the receiver B can reliably support a data rate of $C_f$ bits/sec. Communications over the fiber is interference free, and the $i^{th}$ interface communicates at a rate of $R_i$ bits/sec with the receiver at the central processor, B. The set of all rate vectors may be defined as S, satisfying:

$$S = \sum_{i=1}^{r} R_i = C_f, 0 < R_i \leq C_f, \text{ for } i \in \{1, \ldots, r\} \quad (4)$$

Fiber channel coding is performed at the wireless-to-optical interfaces 407 to reliably achieve the rate vectors in S. Note that the code required for the fiber is a very low complexity one. An example of a code that may be used is the 8B/10B code, which is commonly used in Ethernet. Hence, fiber channel coding does not significant increase the complexity at the wireless-to-optical interface 407. It is assumed that the system has error free communications over the fiber for all sum rates below the fiber capacity. In some embodiments, to keep the interfaces simple, source coding is not done at the interfaces. As presented below in detail, since fiber capacity is large compared to the wireless capacity, the loss from not performing source coding is negligible.

C. The Communications Method

The input to the wireless channel, x, is a zero mean, circularly symmetric, complex Gaussian, random variable, $x \sim CN(0, P/W)$. Note that it is this input distribution that achieves the capacity of the wireless channel model according to an embodiment of the present invention. At each wireless-to-optical interface 407, the output from the antenna 201 is first converted from RF passband to baseband 420 and then sampled at the Nyquist rate of W complex samples/sec 425. A random variable, $y_i$, represents the output from the sampler at the $i^{th}$ interface. Fixed-rate, memoryless, m-dimensional, vector quantization 435 is performed on these samples at a rate of $R_i = W$ bits/complex sample. The quantized complex samples $z_i$ are subsequently sent over the fiber 401 after fiber channel coding and modulation. Thus, the fiber reliably supports a rate of $R_i$ bits/sec from the $i^{th}$ wireless-to-optical interface to the receiver at the central processor, B. The quantizer noise at the $i^{th}$ interface, $q_i$, is modeled as being additive. Hence, the two-hop channel between A and B can be modeled as:

$$\vec{z} = \vec{a}x + \vec{w} + \vec{q} \quad (5)$$

where $\vec{q} = [q_1, \ldots, q_r]^T$. The interfaces have noise from two sources, receiver front end (front end noise $\vec{w}$), and distortion introduced by their quantizers ($\vec{q}$). The quantizer at each interface is an optimal, fixed rate, memoryless, m-dimensional, and high resolution vector quantizer. Hence, its distortion-rate function is given by the Zador-Gersho function:

$$E[|q_i|^2] = E[|y_i|^2] M_m \beta_m 2^{-\frac{R_i}{W}} = \left(N_0 + \frac{E[|a_i|^2]P}{W}\right) M_m \beta_m 2^{-\frac{R_i}{W}} \quad (6)$$

$M_m$ is the Gersho's constant, which is independent of the distribution of $y_i$, and $\beta_m$ is the Zador's factor, which depends on the distribution of $y_i$. As is shown by equation (6), the distortion introduced by the quantizer reduces exponentially with quantizer rate. Since fiber channel capacity is large, the assumption that the quantizer is a high resolution one is valid. Hence, for all i, $R_i = W \gg 1$. Also, as this quantizer is an optimal fixed rate memoryless vector quantizer, the following holds:

$E[q_i] = 0$, $E[z_i q_i^*] = 0$ and $E[y_i q_i^*] = -E[|q_i|^2]$. Therefore, $E[|z_i|^2] = E[|y_i|^2] - E[|q_i|^2]$. The SIMO-FAWNA ergodic capacity used herein is denoted as $C_q(P, W, r, m, C_f)$. This may be expressed as:

$$C_q(P, W, r, m, C_f) = WI(x; \vec{z} \mid \vec{a}) = WE[I(x; \vec{z} \mid a = \vec{a})] = E[C_q^b(P, W, \vec{a}, r, m, C_f)] \quad (7)$$

where $C_q^b(P, W, \vec{a}, r, m, C_f) \triangleq WI(x; \vec{z} \mid \vec{a})$. Since the presented method is one among multiple possible methods for a SIMO-FAWNA, the following may result:

$C_q(P, W, \vec{a}, r, m, C_f) \leq C_{SIMO}(P, W, r, C_f)$. Hence using equation (1), the following may be obtained:

$$C_q(P, W, \vec{a}, r, m, C_f) \leq C_{SIMO}(P, W, r, C_f) < C_w(P, W, r) \quad (8)$$

$C_q(P, W, \vec{a}, r, m, C_f)$ approaches $C_w(P, W, r)$ exponentially with fiber capacity. As explained in detail below, the presented method is near optimal. Observe that the wireless-to-optical interfaces have low complexity and do not require knowledge of the transmitter code book in a preferred embodiment. The interfaces are extendable to FAWNAs with a large number of transmitters and interfaces and offer adaptability to variable rates, changing channel conditions, and node positions.

II. Interference Rate Allocation

In this section, two questions are addressed: First, how should rates be allocated to the interfaces in a coherence block, and second, since channel state varies independently from block to block, is there significant loss in not computing the optimal rate allocation every block? To answer the first question, consider the channel within a block interval. The channel state in this block takes the realization $\vec{a}$. Thus, the following theorem may be established: Theorem 1 For any interface rate allocation, $\vec{R}$:

$$C_q^b(P, W, \vec{a}, r, m, C_f) \geq W\log\left(\frac{1}{1 - \frac{P}{N_0 W}\vec{v}^\dagger M^{-1}\vec{v}}\right) \stackrel{\Delta}{=} \quad (9)$$

$$C_{q,LB}^b(P, W, \vec{a}, r, m, \vec{R})$$

where $\vec{v}$ is specified for $i \in \{1, \ldots, r\}$ as:

$$v_i = a_i\left(1 - M_m \beta_m 2^{-\frac{R_i}{W}}\right)$$

and M is specified for $i \in \{1, \ldots, r\}$, $j \in \{1, \ldots, r\}$ as $$M_{ij} = \frac{a_i a_j^* P}{N_0 W}\left(1 - M_m \beta_m 2^{-\frac{R_i}{W}}\right)\left(1 - M_m \beta_m 2^{-\frac{R_j}{W}}\right) \text{ for } i \neq j,$$

$$\left(1 + \frac{|a_i|^2 P}{N_0 W}\right)\left(1 - M_m \beta_m 2^{-\frac{R_i}{W}}\right) \text{ for } i = j.$$

In the next section, it is shown that the supremum of the lower bound (9) over all rate vectors in S approaches $C_q^b$(P, W, $\vec{a}$ ,r,m,$C_f$) exponentially with fiber capacity. Hence, this lower bound may be considered alone for finding the optimal interface rate allocation. The optimal rate allocation for this block is given by:

$$\vec{R}^*(\vec{a}) = \arg\max_{\vec{R} \in S}\left[C_{q,LB}^b(P, W, \vec{a}, r, m, \vec{R})\right] \quad (10)$$

To understand optimal rate allocation, consider a SIMO-FAWNA with two interfaces, fiber capacity 200 Mbps, channel state $$\vec{a} = \begin{bmatrix} 1 & \frac{1}{2} \end{bmatrix}^T, \frac{P}{N_0} = 100 \times 10^6,$$

W=5 MHz and $M_m\beta_m$=1. Since $R_2=C_f-R_1$, it suffices to consider the capacity with respect to $R_1$ alone.

Figure 5:
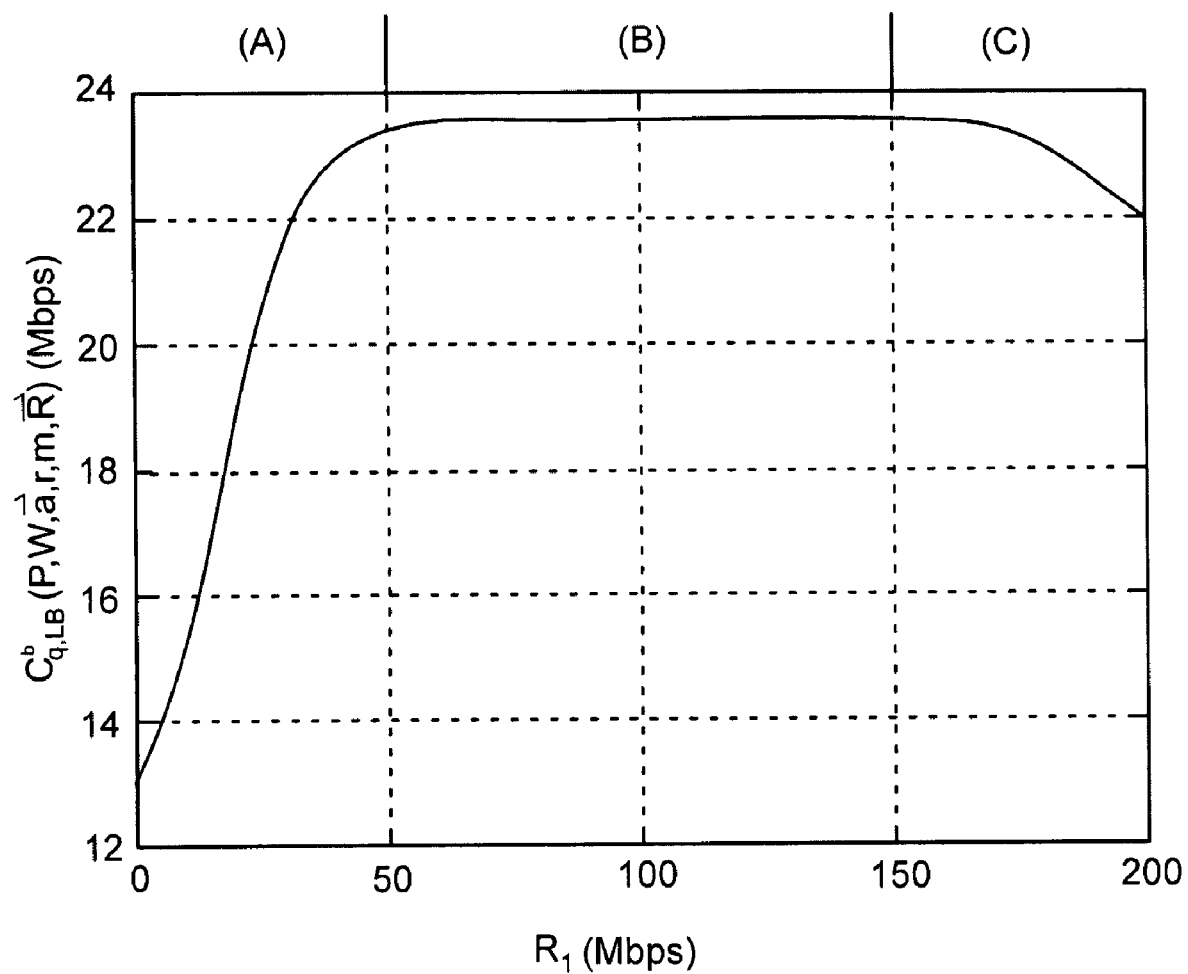
FIG. 5 is a graphical representation of an optimal rate allocation for a fiber aided wireless network with two interfaces.

FIG. 5 is a plot of $C_{q,LB}^b$(P,W, $\vec{a}$ ,r,m, $\vec{R}$) with respect to $R_1$. It should be appreciated that the results obtained in FIG. 5 may generalize to SIMO-FAWNAs with any number of interfaces. The plot of FIG. 5 may be divided into three regions: A, B and C. The first region is from 0 Mbps to 50 Mbps (A), where the first interface has low rate and the second has high rate. It should be appreciated that a low rate is considered high enough for the high resolution quantizer model to be valid. Thus, noise at the first interface is quantizer distortion dominated, whereas noise at the second interface is front end noise dominated. Hence, as the rate for the first interface is increased, the distortion at the first interface decreases, and overall capacity increases. The reduction in rate at the second interface due to increase in R1 has negligible effect on capacity since front end noise still dominates at the second interface.

The second region is from 50 Mbps to 170 Mbps (B). In this region, the rates for both interfaces are high enough for front end noise to dominate. Since quantizer distortion is low with respect to the front end noise at both interfaces, capacity is almost invariant to rate allocation. Observe that the capacity in this region is higher than that in the first and third regions, and the size of this region is much larger than that of the first and third.

The third region is from 170 Mbps to 200 Mbps (C), and here, the first interface has high rate, and the second has low rate. Therefore, noise at the first interface is front end noise dominated whereas noise at the second interface is quantization distortion dominated. An increase in rate for the first interface results in a decrease in rate for the second interface. This decrease in rate results in an increase in quantization distortion at the second interface, which results in overall capacity decrease.

The channel gain at the first interface is higher than that at the second interface. Hence, compared to the second interface, the first interface requires more rate to bring its quantizer's distortion below the front end noise power. Also, reduction in quantizer distortion at the first interface results in higher capacity gains than reduction in quantizer distortion at the second interface. This can been seen from the asymmetric nature of the plot in FIG. 5 around $R_1$=100 Mbps.

The optimum interface rate allocation for a FAWNA is to ensure that each interface gets enough rate for it to lower its quantizer distortion to the point where its noise is front end noise dominated. Wireless-to-optical interfaces seeing higher channel gains require higher rates to bring down their quantizer distortion. After this requirement is met, FAWNA capacity is almost invariant to allocation of left over fiber capacity. This can be seen from the capacity curve in the second region (B) of the plot in FIG. 5. Thus, any interface rate allocation that ensures that noise at none of the wireless-to-optical interfaces is quantization distortion dominated is near optimal.

Since fiber capacity is large compared to the wireless capacity, a fraction of fiber capacity is needed to bring down the distortion for the interfaces so the quantization distortion in the interfaces is limited or small. Therefore, the set of interface rate vectors for which $C_{q,LB}^b$(P,W, $\vec{a}$ ,r,m, $\vec{R}$) is near maximum is large, and there is considerable flexibility in allocating rates across the interfaces. Therefore, large fiber capacity brings robustness to interface rate allocation in a FAWNA. For example, from FIG. 5, as may be seen from the graphical data, even an equal rate allocation for the two interface SIMO-FAWNA is near-optimal.

The second question posed at the beginning of this section is now discussed. Since channel state changes independently from block to block, is there significant loss in not computing the optimal rate allocation every block? First, consider the case where interface rate allocation is dynamic, i.e., done in every block. The optimal rate allocation vector for the block is given by equation (10) above, and it depends on the channel realization (state). The ergodic capacity lower bound of a SIMO-FAWNA with dynamic rate allocation is given by:

$$C_{q,LB}^{D}(P,W,r,m,C_f)=E[C_{q,LB}^{b}(P,W,\vec{a},r,m,\vec{R}*(\vec{a}))].$$

Consider the same two interface SIMO-FAWNA as in the previous question but with channel state $$\vec{a} = \left[h_1 \frac{1}{2}h_2\right]^T,$$

where $h_1$ and $h_2$ are i.i.d $CN(0,1)$. For this channel, $C_{q,LB}^{D}(P,W,r,m,C_f) \sim 21.4$ Mbps is computed.

Figure 6:
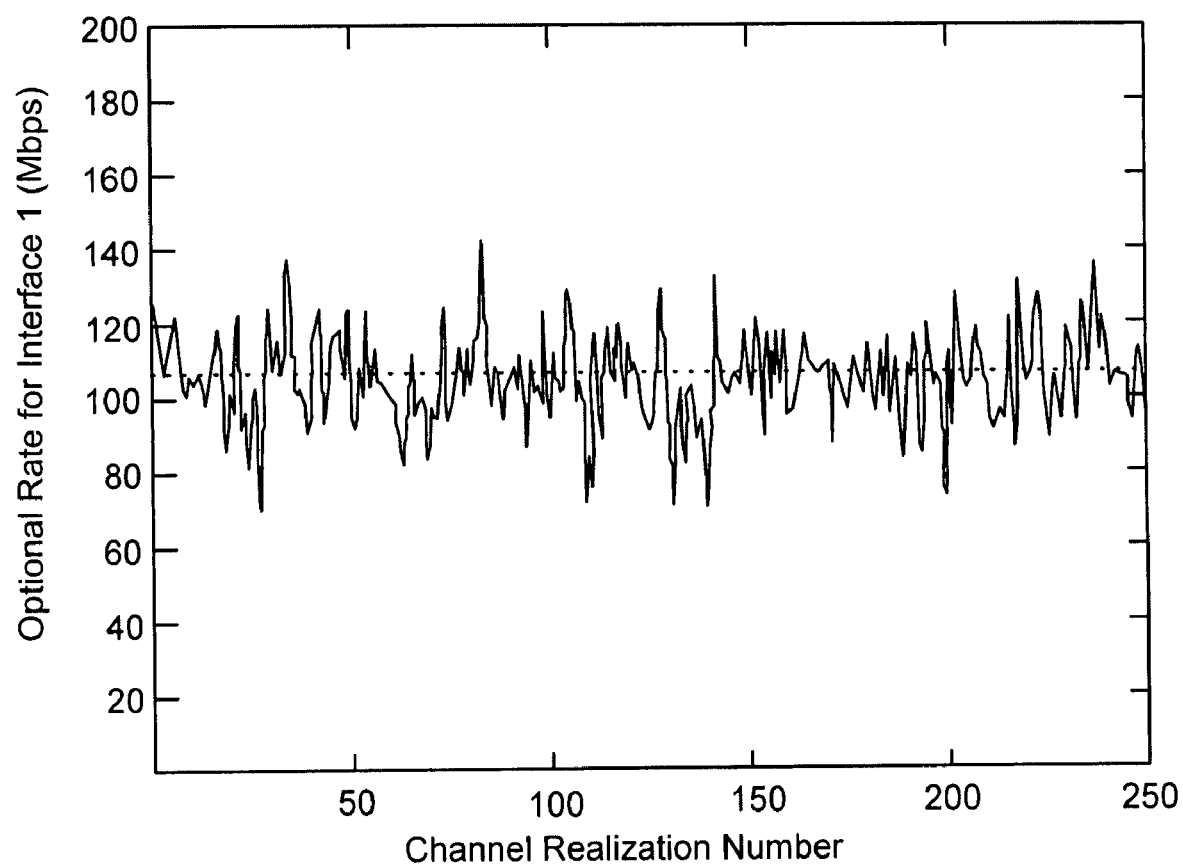
FIG. 6 is a graphical representation depicting effects on optimal rate with changes in channel realization.

FIG. 6 shows how the optimal rate for the first interface, $R_1^*$, changes with channel realization. Since the average channel gain at the first interface is larger than that at the second, the mean of the observations in FIG. 6 is above half the fiber capacity.

Dynamic rate allocation involves computation of the optimal rate allocation vector at the receiver at B and updating the interfaces with optimal values of rates, every coherence block. This considerably increases the complexity in a FAWNA. In order to simplify, static rate allocation (i.e., interface rate allocation is computed based on wireless channel statistics and fixed forever) may be employed. The interface rate allocation vector is chosen as one that maximizes the ergodic capacity lower bound:

$$\vec{R}_S^* = \arg \max_{\vec{R} \in S} E\left[C_{q,LB}^{b}(P, W, \vec{a}, r, m, \vec{R})\right]$$

Hence, the ergodic capacity lower bound of a SIMO-FAWNA with static rate allocation is:

$$C_{q,LB}^{S}(P,W,r,m,C_f)=E[C_{q,LB}^{b}(P,W,\vec{a},r,m,\vec{R}_S^*)].$$

Note that this is sub-optimal to dynamic rate allocation:

$$C_{q,LB}^{S}(P,W,r,m,C_f) \leq C_{q,LB}^{D}(P,W,r,m,C_f) \leq C_q(P,W,r,m,C_f).$$

Figure 7:
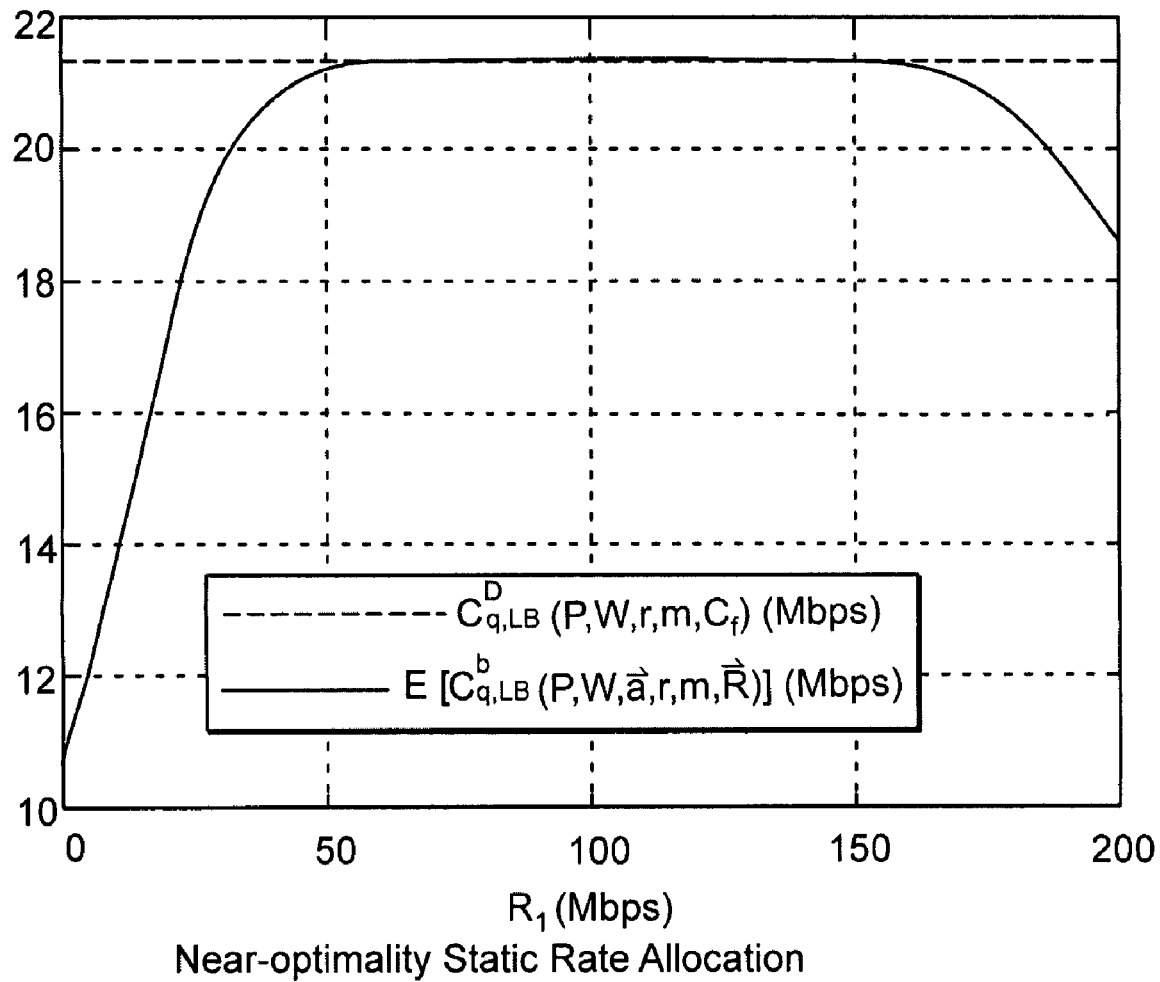
FIG. 7 is a graphical representation depicting effects on capacity with changes in rate.

FIG. 7 shows how ergodic capacity changes with $R_1$ for the two interface SIMO-FAWNA. Since the ergodic capacity is the capacity averaged over channel realizations, this plot is similar to that in FIG. 5. From FIG. 7, one may observe that $C_{q,LB}^{S}(P,W,r,m,C_f)=21.35$ Mbps, and the near optimal rates for interface 1 are $R_{S,1}^* \sim [72,142]$ Mbps.

Note that the loss from static rate allocation is very small. Moreover, the set of static rate allocation vectors for which this loss is very small is large. For this example, the loss is only 50 Kbps or 0.23% of capacity, and all rates from 72 Mbps to 142 Mbps are close to optimal for interface 1. Though the SIMO-FAWNA capacity is sensitive to quantization distortion, large fiber capacity ensures that the interfaces always have enough rate so that they are never distortion limited over the typical set of channel realizations. This robustness of FAWNA capacity to interface rate allocation makes static rate allocation near-optimal. Observe from FIG. 7 that even equal rate allocation is near-optimal. This near-optimality of static rate allocation translates to considerable reduction in FAWNA complexity.

III. Effect of Various Parameters on Performance

In this section, the effect of quantizer dimension, fiber capacity, transmit power, number of interfaces, and wireless bandwidth is analyzed on the performance of an example embodiment of the present invention. To simplify analysis, the wireless channel gain $\vec{a}=g\cdot\vec{1}$ is set, where $\vec{1}$ is a r-dimensional column vector with all ones and g is a complex random variable. For this channel, all interfaces have the same instantaneous received power. Hence, an equal interface rate allocation is optimal:

$$\vec{R}^*(g\cdot\vec{1}) = \vec{R}_S^* = \frac{C_f}{r}\cdot\vec{1},$$

and there is no loss from static interface rate allocation. Hence, $C_{q,LB}^{S}(P,W,r,m,C_f)=C_{q,LB}^{D}(P,W,r,m,C_f)$.

Since the ergodic capacity using dynamic rate allocation is the same as that using static rate allocation, the superscript is removed to simplify notation and denote the ergodic capacity lower bound as $C_{q,LB}(P,W,r,m,C_f)$. Using Theorem 1, this lower bound may be expressed as:

$$C_{q,LB}(P, W, r, m, C_f) = WE\left[\log\left(1 + \frac{r|g|^2\left(1 - M_m\beta_m 2^{\frac{-C_f}{rW}}\right)\frac{P}{N_0W}}{1 + \frac{|g|^2 P\left(1 - M_m\beta_m 2^{\frac{-C_f}{rW}}\right)}{N_0W}}\right)\right] \quad (11)$$

In this section, it is shown that the lower bound of equation (11) approaches the upper bound $C_w(P, W, r)$ in equation (8) exponentially with fiber capacity. Hence, since the fiber capacity is large, the lower bound almost completely characterizes $C_q(P, W, r, m, C_f)$, and it may be considered alone for analysis.

A. Effect of Quantizer Dimension

The effect of quantizer dimension, m, on the performance of the proposed method is presented. Since Gaussian signaling is used for the wireless channel, the input to the quantizer at the interface is a correlated Gaussian random vector. Zador's factor and Gersho's constant obey the following property: $M_\infty\beta_\infty \leq M_m\beta_m \leq M_1\beta_1 \leq M_1\beta_1^G$, where $\beta_1^G$ is the Zandor's factor for an i.i.d Gaussian source and $\beta_1 \leq \beta_1^G$. $M_m\beta_m$ decreases with an increase in m. Since $$M_1 = \frac{1}{12}, M_\infty = \frac{1}{2\pi e},$$

$\beta_1^G = 6\sqrt{3\pi}$ and $$\beta_\infty = 2\pi e, 1 \leq M_m\beta_m \leq \frac{\pi\sqrt{3}}{2}.$$

The lower bound corresponds to fixed rate infinite dimensional vector quantization, whereas the upper bound corresponds to fixed rate scalar quantization. In (11)

$$\frac{r|g|^2\left(1-M_m\beta_m 2^{\frac{-C_f}{rW}}\right)\frac{P}{N_0 W}}{1+\frac{|g|^2 P\left(1-M_m\beta_m 2^{\frac{-C_f}{rW}}\right)}{N_0 W}}$$

decreases monotonically with increase in $M_m\beta_m$. Hence $C_{q,LB}(P,W,r,m,C_f)$ increases with m and can be lower and upper bounded as $C_{q,LB}(P,W,r,1,C_f) \leq C_{q,LB}(P,W,r,m,C_f) \leq C_{q,LB}(P,W,r,\infty,C_f)$, where $C_{q,LB}(P,W,r,1,C_f)$ and $C_{q,LB}(P,W,r,\infty,C_f)$ correspond to ergodic capacity lower bounds for fixed rate scalar and infinite dimensional vector quantization at the interfaces, respectively. Reduction in quantizer dimension reduces complexity at the interface but results in a capacity penalty. The maximum loss in capacity occurs when fixed rate scalar quantizers are used at the wireless-to-optical interfaces.

B. Effect of Fiber Capacity

An effect of fiber capacity on the performance of a SIMO-FAWNA is now analyzed. Define $\Phi(C_f) \triangleq C_w(P,W,r) - C_{q,LB}(P,W,r,m,C_f)$. From equations (3, 11), the following equation may be derived:

$$\Phi(C_f) = -WE\left[\log\left(1 - \frac{r|g|^2 \frac{P}{N_0 W}\left(1+\frac{|g|^2 P}{N_0 W}\right) M_m\beta_m 2^{\frac{-C_f}{rW}}}{1+\frac{|g|^2 P M_m\beta_m 2^{\frac{-C_f}{rW}}}{N_0 W}}\right)\right].$$

Now, $$\Phi(C_f) = -WE\left[\log\left(1 - \frac{r|g|^2 P}{N_0 W}\left(1+\frac{|g|^2 P}{N_0 W}\right) M_m\beta_m 2^{\frac{-C_f}{rW}}\right)\right]$$
$$= O(2^{-C_f}),$$

$$\Phi(C_f) = -WE\left[\log\left(1 - \frac{r|g|^2 \frac{P}{N_0 W}\left(1+\frac{|g|^2 P}{N_0 W}\right)}{1+\frac{|g|^2 P M_m\beta_m}{N_0 W}} M_m\beta_m 2^{\frac{-C_f}{rW}}\right)\right] = \Omega(2^{-C_f}),$$

$$\Rightarrow \Phi(C_f) = \Theta(2^{-C_f}).$$

Figure 8:
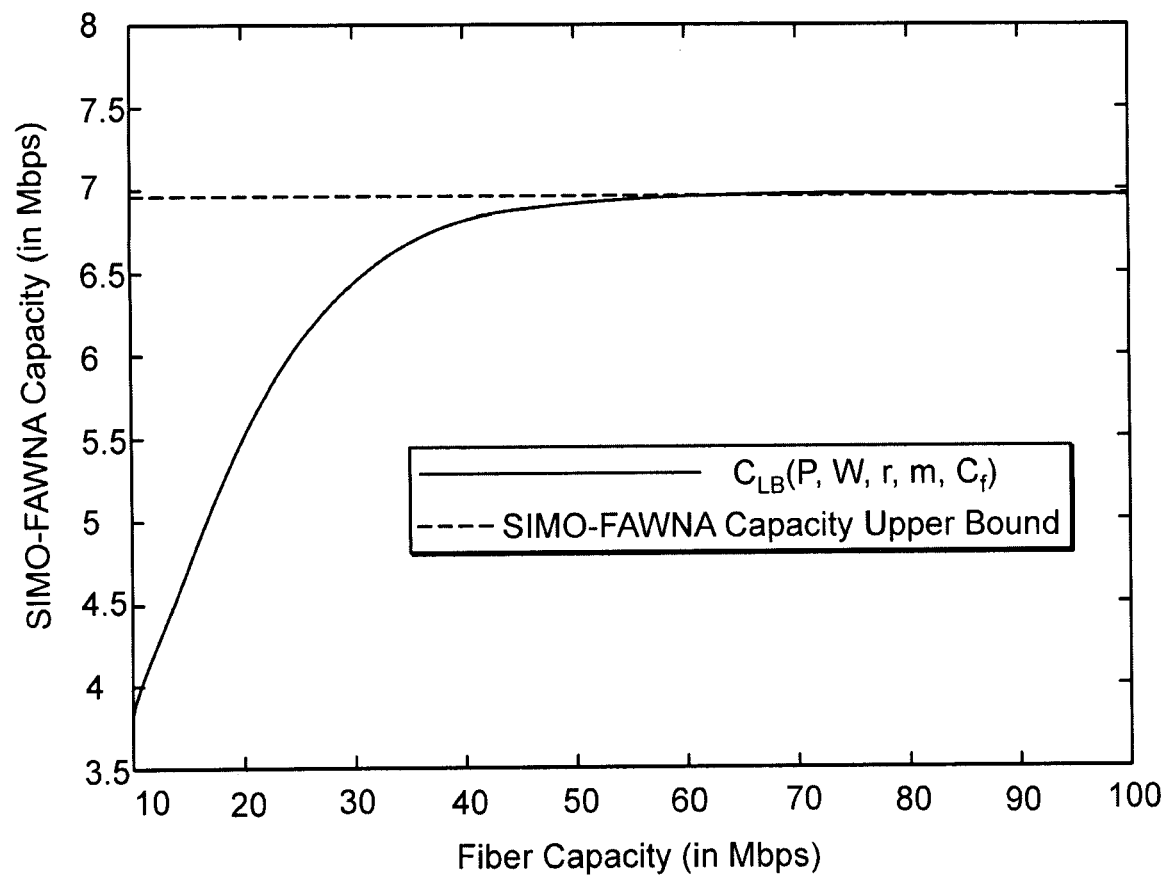
FIG. 8 is a graphical representation depicting an effect of fiber capacity on a performance of a fiber aided wireless network.

Therefore, $C_{q,LB}(P,W,r,m,C_f) = C_w(P,W,r) - \Theta(2^{-C_f})$. This implies that the ergodic capacity lower bound using the example embodiment approaches the capacity upper bound of equation (8) exponentially with fiber capacity. Also, observe that $\Phi(\infty)=0$ Note that, though the example embodiment quantizes and forwards the wireless signals without source coding, it may be seen as near optimal since the fiber capacity is much larger than the wireless capacity. This behavior is illustrated in FIG. 8. In the plot, the following is set;

$$g \sim CN(0,1), \ W = 1 \text{ Mhz}, \ M_m\beta_m$$
$$= 1, r$$
$$= 5 \text{ and } \frac{P}{N_0}$$
$$= 25 \times 10^6 \text{ sec}^{-1}.$$

Note that the fiber capacity required to achieve good performance is not large for an optical fiber, which has speeds in the order of Gigabit/sec.

C. Effect of Transmit Power

An increase in transmit power, P, leads to two competing effects. The first is increase in receive power at the interfaces, which increases capacity. The second is increase in quantizer distortion, which reduces capacity. The ergodic capacity lower bound of an embodiment has $C_{q,LB}(P,W,r,m,C_f)$ increasing monotonically with $$\frac{r|g|^2\left(1-M_m\beta_m 2^{\frac{-C_f}{rW}}\right)\frac{P}{N_0 W}}{1+\frac{|g|^2 P M_m\beta_m 2^{\frac{-C_f}{rW}}}{N_0 W}},$$

which in turn increases monotonically with P. Hence, the first effect always dominates the ergodic capacity lower bound and increases with transmit power.

D. Effect of Number of Wireless-to-Optical Interfaces

The following illustrates a focus on an effect of the number of interfaces, r, on $C_{q,LB}(P,W,r,m,C_f)$. In embodiments in which the quantization rate at the interface is never allowed to go below 1, the maximum number of interfaces possible is $$r_{max} = \left[\frac{C_f}{W}\right].$$

Keeping all other variables fixed, the optimal number of interfaces, r*, is given by:

$$r^* = \arg\max C_{q,LB}(P,W,r,m,C_f)$$
$$r \in \{1, 2, \ldots, r\max\}$$

For fixed wireless bandwidth and fiber capacity, an increase in the number of interfaces leads to two competing effects. First, capacity increases owing to receive power gain from the additional interfaces. Second, quantization distortion increases owing to additional interfaces sharing the same fiber, which results in capacity reduction. The quantization rate per symbol decays inversely with r. Hence, capacity does not increase monotonically with the number of antennas. Obtaining an analytical expression for r* is difficult. However, r* can easily be found by numerical techniques.

Figure 9:
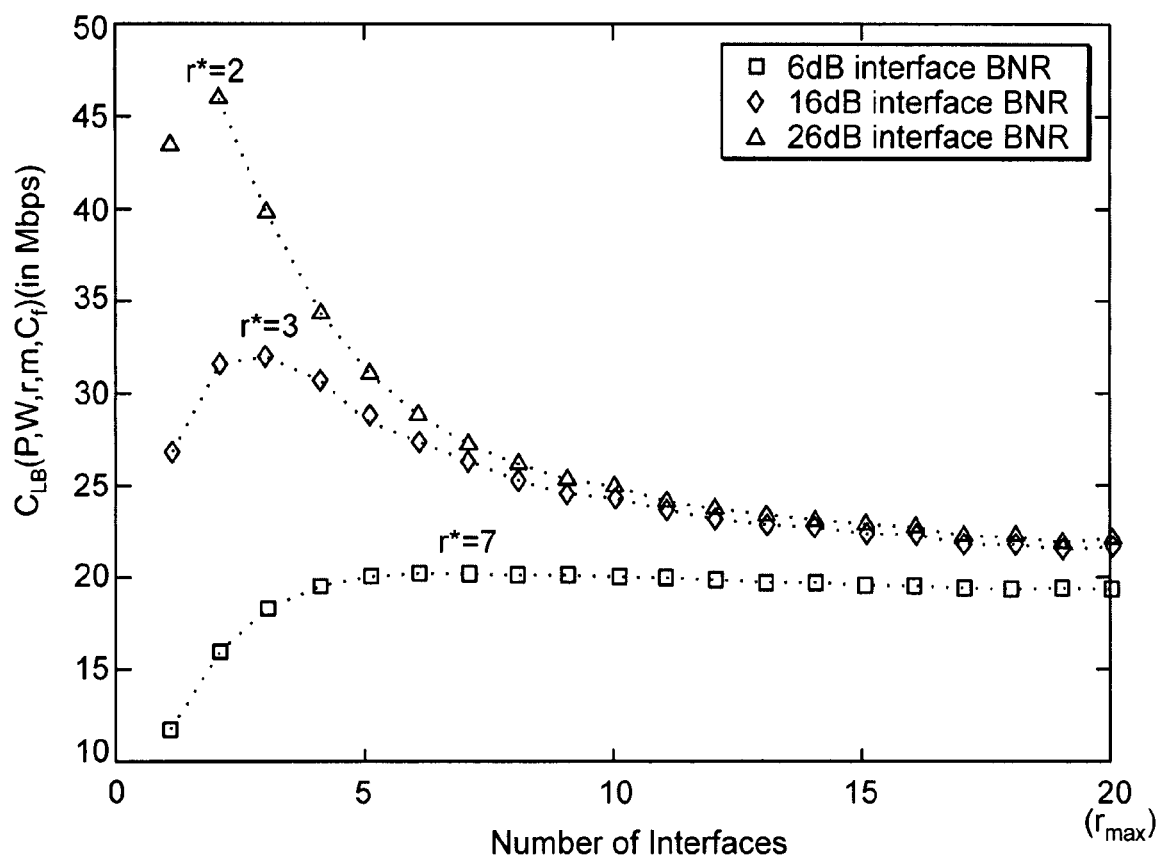
FIG. 9 is a graphical representation depicting an effect on capacity with changes in a number of interfaces in a fiber aided wireless network.

FIG. 9 is a plot of $C_{q,LB}(P,W,r,m,C_f)$ verses r for $g \sim CN(0,1)$, W=5 Mhz, $M_m\beta_m=1$, $C_f=100$ Mbps. Note that, for this example, $r_{max}=20$. Plots are obtained for $$\frac{P}{N_0} = 20 \times 10^6 \text{ sec}^{-1}, 200 \times 10^6 \text{ sec}^{-1}, \text{ and } 2000 \times 10^6 \text{ sec}^{-1},$$

which correspond to average interface signal-to-noise ratios (SNR) of 6 dB, 16 dB and 20 dB, respectively. The corresponding values of r* are 7, 3, and 2, respectively. Observe that r* decreases with increase in average interface SNR. This happens because, when the average interface SNR is low, it becomes more important to gain power rather than to have fine quantization. On the other hand, when average interface SNR is high, the latter is more important. Hence, as average interface SNR decreases, r* tends towards $r_{max}$.

E. Effect of Wireless Bandwidth

The following analyzes an effect of wireless bandwidth, W, on $C_{q,LB}(P,W,r,m,C_f)$. In embodiments in which the quantization rate is never allowed to go below 1, the maximum possible bandwidth is $$\frac{C_f}{r}.$$

For fixed fiber capacity and number of interfaces, the optical bandwidth of operation, W*, is given by:

$$W^* = \arg\max C_{q,LB}(P, W, r, m, C_f)$$
$$W \in \left[0, \frac{C_f}{r}\right].$$

Since quantization distortion as well as power efficiency increases with W, the behavior of the capacity lower bound with bandwidth is similar to that with the number of interfaces. Note that the quantization rate at each interface decays inversely with bandwidth. When the operating bandwidth is lowered from W*, the capacity lower bound is lowered because the reduction in power efficiency is more than the reduction in quantizer distortion. On the other hand, when the operating bandwidth is increased from W*, the loss in capacity from increased quantizer distortion is more than the capacity gain from increased power efficiency. The optimal bandwidth, W*, can be found by numerical techniques.

Figure 10:
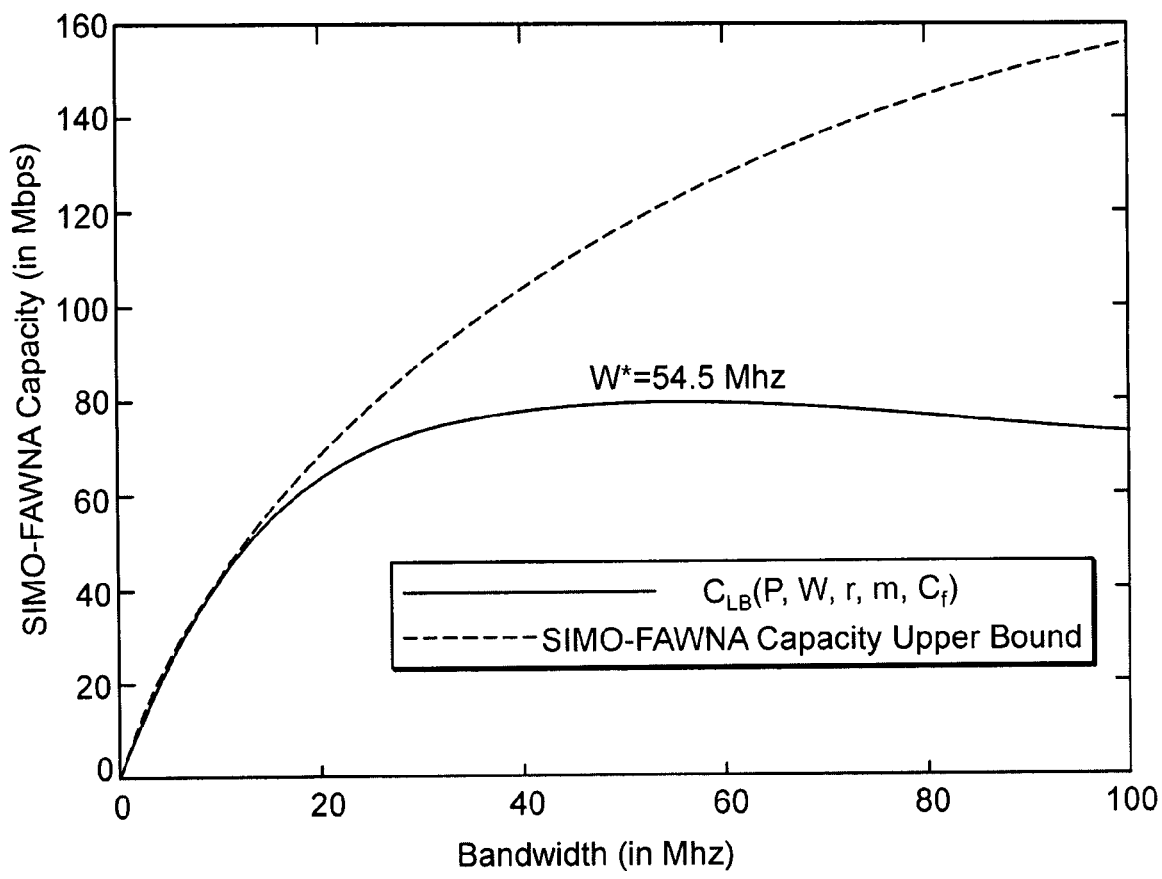
FIG. 10 is a graphical representation depicting an effect on capacity of a fiber aided wireless network with regard to wireless bandwidth.

FIG. 10 shows the plot of the capacity lower bound and $C_w(P, W, r)$, for $$g \sim CN(0, 1), C_f = 100 \text{ Mbps}, M_m \beta_m$$
$$= 1, r$$
$$= 2, \text{ and } \frac{P}{N_0}$$
$$= 100 \times 10^6 \text{ sec}^{-1}.$$

The optical bandwidth for this case is W*=52.4 Mhz.

A SIMO-FAWNA study from a capacity viewpoint and a near-optimal design has been described herein. An optimal interface rate allocation, in which one ensures that each interface gets enough rate so that its noise is dominated by front end noise rather than quantizer distortion, has been determined. Capacity may be almost invariant to the way in which leftover fiber capacity is allocated. Hence, large fiber capacity ensures robustness of SIMO-FAWNA capacity to interface rate allocation. This robustness has an important implication on design, rather than dynamically change interface rate allocation based on channel state, and a fixed rate allocation can be adopted with very small loss in capacity. This results in considerable reduction in system complexity. It has also been demonstrated that for a given fiber capacity, there is an optimal operating wireless bandwidth and an optimal number of wireless-to-optical interfaces. In many embodiments, the wireless-to-optical interfaces have low complexity and do not require knowledge of the transmitter code book. The design also has extendibility to FAWNAs with large numbers of transmitters and interfaces and offers adaptability to variable rates, changing channel conditions, and node positions.

While this invention has been particularly shown and described with references to example embodiments thereof, it will be understood by those skilled in the art that various changes in form and details may be made therein without departing from the scope of the invention encompassed by the appended claims.

What is claimed is:

1. A communications system, comprising:
multiple interfaces configured to receive wireless communications signals and transmit non-decoded signals on at least one communications path, each interface including a conversion unit with a quantizer to convert the wireless communications signals to non-decoded signals by quantizing the wireless communications signals in an encoded state; and
a central processor coupled to the at least one communications path to jointly process the non-decoded signals to produce decoded information, a data rate between the central processor and a given interface being allocated to allow the guantizer to quantize the wireless communications signals with quantization distortion less than noise at a front end of the given interface.

2. The communications system of claim 1 wherein the central processor is configured to jointly process the non-decoded communications using a technique applicable to combining signals received by multiple antennas.

3. The communications system of claim 1 wherein the central processor includes a transmitter unit configured to transmit the decoded information in the form of packets.

4. The communications system of claim 3 wherein the central processor includes a transmitter unit configured to transmit the decoded information to a node in a network.

5. The communications system of claim 1 wherein the central processor is configured to transmit a downstream signal to at least a subset of the multiple interfaces in a substantially simultaneous manner.

6. The communications system of claim 1 wherein the interfaces include a downconverter to downconvert the wireless communications signals to baseband signals without downconverting to intermediate frequency signals.

7. The communications system of claim 6 wherein the interfaces further include a sampler to sample the baseband signals at a rate equal to at least a rate at which the wireless communications signals are received.

8. The communications system according to claim 1 wherein the interfaces are configured to support a given bandwidth to balance quantization errors and power efficiency.

9. The communications system of claim 1 wherein the at least one communications path includes an optical fiber.

10. The communications system of claim 9 wherein multiple interfaces are coupled to the optical fiber.

11. The communications system of claim 10 wherein the optical fiber has a fixed data rate capacity and the interfaces coupled to the optical fiber are selectively enabled to support wireless-to-fiber communications with the fixed data rate capacity.

12. The communications system of claim 1 wherein the number of communication paths are equal to or greater than the number of interfaces.

13. The communications system of claim 1 wherein the interfaces are configured to receive the wireless communications signals at a first data rate and wherein the interfaces are configured to transmit the non-decoded communications to the central processor at a second data rate that is greater than the first data rate.

14. A method of providing a fiber aided wireless network, comprising:
converting a wireless communications signal to a non-decoded communications signal on at least one communications path by;
allocating a data rate to allow quantizing to occur with a quantization distortion less than noise at a front end of a respective interface; and
quantizing the wireless communications signal in an encoded state; and
jointly processing the non-decoded signals on the at least one communications path to produce decoded information.

15. The method of claim 14 wherein jointly processing the non-decoded signals further comprises using a technique applicable to combining signals received by multiple antennas.

16. The method of claim 14 wherein jointly processing the non-decoded signals further comprises transmitting the decoded information in the form of packets.

17. The method of claim 16 wherein jointly processing the non-decoded signals further comprises transmitting the decoded information to a node in a network.

18. The method of claim 14 wherein jointly processing the non-decoded signals further comprises transmitting a downstream signal to at least a subset of the multiple interfaces in a substantially simultaneous manner.

19. The method of claim 14 wherein converting the wireless communications signals further comprises downconverting the wireless communications signals to baseband signals without downconverting to intermediate frequency signals.

20. The method of claim 19 wherein downconverting the wireless communications signals further comprises sampling the baseband signals at a rate equal to at least a rate at which the wireless communications signals are received.

21. The method of claim 14 wherein converting the wireless communications signals further comprises configuring interfaces to support a given bandwidth to balance quantization errors and power efficiency.

22. The method of claim 14 further comprising transmitting via an optical fiber the non-decoded information on the at least one communications path.

23. The method of claim 22 wherein the optical fiber has a fixed data rate capacity and further comprising selectively converting the wireless communications signal to the non-decoded signal at multiple locations along the optical fiber.

24. The method of claim 23 wherein the number of communication paths is equal to or greater than the number of locations at which converting the wireless communication signals occurs.

25. The method of claim 14 wherein converting the wireless communications signal further comprising receiving the wireless communications signals at a first data rate and transmitting the non-decoded information at a second data rate, wherein the second data rate is greater than the first data rate.

* * * * *

UNITED STATES PATENT AND TRADEMARK OFFICE
CERTIFICATE OF CORRECTION

PATENT NO. : 7,684,709 B2
APPLICATION NO. : 11/540975
DATED : March 23, 2010
INVENTOR(S) : Siddharth Ray, Muriel Medard and Lizhong Zheng It is certified that error appears in the above-identified patent and that said Letters Patent is hereby corrected as shown below:

In column 16, Claim 1, line 25, delete "guantizer" and insert --quantizer--.

Signed and Sealed this

Eighteenth Day of May, 2010

David J. Kappos
*Director of the United States Patent and Trademark Office*